United States Patent
Kruper

[15] 3,671,830
[45] June 20, 1972

[54] SINGLE PHASE MOTOR STARTING CONTROL APPARATUS

[72] Inventor: Andrew P. Kruper, Pittsburgh, Pa.

[73] Assignee: Westinghouse Electric Corporation, Pittsburgh, Pa.

[22] Filed: June 24, 1970

[21] Appl. No.: 49,397

[52] U.S. Cl..........................................318/221 E, 318/227
[51] Int. Cl. .........................................................H02p 1/44
[58] Field of Search............................318/221 R, 221 E, 227

[56] References Cited

UNITED STATES PATENTS 3,421,064   1/1969   Phillips..............................318/221 E
3,530,348   9/1970   Conner..............................318/221 E Primary Examiner—Gene Z. Rubinson
Attorney—A. T. Stratton, F. P. Lyle and Gordon H. Telfer

[57] ABSTRACT

A starting circuit for a single phase electric motor, particularly a capacitor start motor, is provided that includes a solid state switch connected in series with the motor starting winding and the capacitor for controlling the supply of power to the starting winding in accordance with switching signals that are developed by a triggering circuit one of whose inputs is a signal proportional to the voltage in the starting winding and is produced by means directly electrically connected across the starting winding. The improved reliability of solid state switching is provided as compared with mechanical relays as has previously been used. Pull in and drop out points may be readily set.

5 Claims, 3 Drawing Figures

PATENTED JUN 20 1972 3,671,830

WITNESSES:
Bernard R. Gieguay
James T. Young

INVENTOR
Andrew P. Kruper
BY
Gordon H. Telfer
ATTORNEY

SINGLE PHASE MOTOR STARTING CONTROL APPARATUS

BACKGROUND OF THE INVENTION

1. Field of the Invention

The present invention relates to speed sensitive switching apparatus, particularly for controlling the supply of power to the starting winding of a single phase electric motor.

2. Description of the Prior Art

A single phase electric motor generally has two windings, the main or running winding and the auxiliary or starting winding, which are physically displaced from each other on the stator of the motor, and which carry currents which are displaced in phase, such as by reason of a capacitor in the starting winding circuit. When such motors are started, both windings are connected to a single phase supply line and because of the phase displacement between their currents, a starting torque is developed. When the motor is accelerated to a sufficiently high speed, the starting winding is disconnected from the single phase supply line, resulting in a more efficient operation of the motor. The disconnection of the starting winding is achieved by a speed sensitive switching device generally located in the starting winding circuit.

Commonly used switching devices include centrifugal switches which disconnect the starting winding by means of contacts in a stationary portion of the switch, which switch is activated at a predetermined rotational speed by mechanical elements mounted on the shaft of the motor. Other prior art means include current responsive relays and voltage responsive relays connected to the starting winding.

In the case of motor starting switches as well as in other applications there has been considerable interest in avoiding the use of mechanical switches by some solid state switching means that provides higher reliability and may provide other advantages. One such proposal is that described in Petrocelli U.S. Pat. No. 2,929,978, Mar. 22, 1960. Among the advantages sought through the use of solid state switching is the ability to select pickup and dropout speeds as may be desired by the users rather than having them built into the motor in the characteristics of the speed sensitive switch. In the Petrocelli patent, the auxiliary winding circuit includes a solid state switch, a hyperconductive negative resistance adjustable breakdown device, for blocking current flow in the auxiliary winding circuit. The breakdown voltage of the switching device is greater than the magnitude of the potential across the device from the power supply. Circuit means are provided for producing a control potential applied to the switching device to reduce the breakdown voltage level of the device to a value below the magnitude of the power supply potential. This control potential is prevented from application to the switching device by a speed sensitive voltage responsive apparatus to produce a blocking voltage. This speed sensitive voltage responsive apparatus as disclosed in the patent includes an inductor alternator having a rotor adapted to rotate with the rotating member of the motor and a stationary magnetized field structure having an alternating current voltage output with a magnitude proportional to the speed of rotation of the rotor. This electromechanical scheme while providing effective voltage sensing is unduly cumbersome and expensive in application.

Other approaches, e.g. U.S. Pat. No. 3,414,789, taken by the prior art include the replacement of current sensitive mechanical relays by solid state switching means responsive to the current in the main winding. Unfortunately such approaches are subject to inaccurate switching because the current sensed varies with loading of the motor and line voltage variations as well as with the speed of the motor so that switching is not accomplished in response merely to motor speed.

It is also known, e.g. U.S. Pat. No. 3,307,093, to provide a phase controlled current supply for single phase induction motors so that the starting winding need not be disconnected upon reaching rated motor speed but rather a solid state switch such as a silicon controlled rectifier controls the interval of current conduction to the starting winding in each half cycle of the applied line voltage. During the starting condition the switching means is switched on at a predetermined angle to provide a phase controlled current to the starting winding that will produce the desired starting torque. During the running condition of the motor the angle at which the switching means is turned on is preferably delayed to reduce the interval of current conduction to the starting winding. Such means are applicable to starting arrangements for single phase motors other than capacitor start motors wherein the capacitor provides the requisite phase difference.

Additionally, it is known to the prior art, e.g. U.S. Pat. 3,349,307, to provide speed control for a single phase motor, such as a capacitor start motor, wherein a controlled potential, which is developed across a variable impedance connected in parallel with the phase winding or starting winding and which increases in magnitude as the speed of the motor increases, is applied to the control electrode of the controllable switching device, also connected in parallel with the phase winding, for triggering this device to conduction whereby the potential applied to the phase winding over that portion of each cycle during which it is conducting is reduced to substantially zero, thereby providing for variable speed control by varying the viarable impedance. In such an arrangement the starting winding is not disconnected from the circuit upon reaching a predetermined speed but rather remains in the circuit for continual use in varying the speed of the motor.

It is also acknowledged to be within the prior art to use solid state switches having thermistors to either switch the starting winding directly or used in connection with a solid state AC switch. These proposals suffer from inherent limitations. They are basically time delay circuits which relay on self-heating of the thermistor and since they relay on heating they must remain with the power off for a certain period of time in order for the thermistor to cool off before the motor can be restarted.

SUMMARY OF THE INVENTION

Among the objects of this invention are to provide an improved starting circuit arrangement for single phase induction motors, particularly capacitor start motors, with adjustable pull in and drop out points, high reliability provided by solid state switching elements as opposed to mechanical switching elements, and precise operation by sensing accurately the speed of the motor in operation uninfluenced by load conditions and line voltage variations.

The above mentioned and additional objects and advantages of the invention are achieved in the combination of a single phase electric motor having a main winding and a starting winding; solid state switch means connected with the starting winding, preferably in direct series connection therewith, for controlling the supply of power thereto; means are provided to supply switching signals to the switch that include means for directly electrically sensing voltage across the starting winding so as to avoid cumbersome and expensive electromechanical elements. Also the direct sensing of the voltage across the starting winding provides a signal directly proportional to the speed of the motor not influenced by loading conditions. The circuitry for supplying the switching signals can have settable elements that permit adjustment of pull in and drop out points for operation.

A suitable form of apparatus in accordance with this invention is one that includes a triac as the solid state switching device with its power electrodes connected in series with the start winding across the power terminals. A gate electrode of the triac is connected with a trigger circuit portion, such as a Schmitt trigger circuit or other solid state trigger circuit. The trigger circuit is actuated by a sensing circuit portion that is directly coupled to and senses the voltage across the start winding.

DESCRIPTION OF THE PREFERRED EMBODIMENTS

Figure 1:
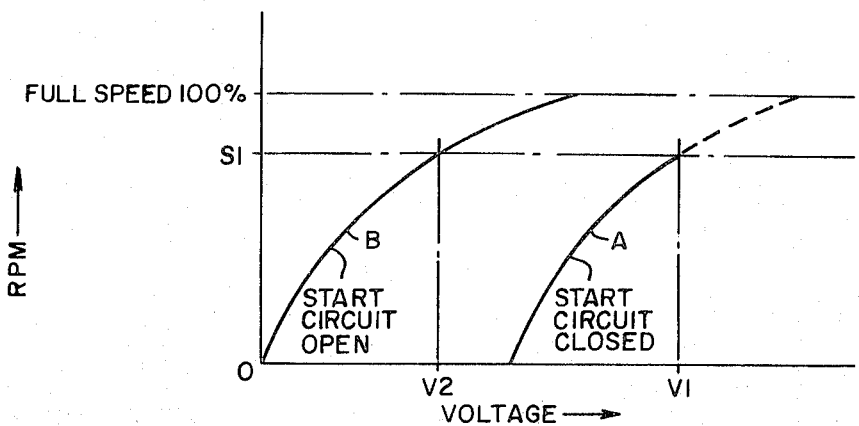
FIG. 1 is a set of curves illustrating the relationship of voltage across the starting winding of a single phase motor to motor speed.

Referring to FIG. 1, it can be seen that for a single phase, capacitor start motor two generally parallel curves exist for the start winding voltage: curve A is for the winding connected to the line voltage and curve B is for the case in which the start winding is not connected to the line voltage. If it is desired to cause the start winding switch to open at a particular motor speed, S1, a circuit that senses that speed to cause opening of the starting switch at any voltage greater than the voltage V1 related to the speed S1 on curve A may be used, in accordance with the general teachings of the above mentioned Petrocelli patent. Once the starting winding circuit is opened, the circuit should not reclose until the start winding voltage drops below curve B's corresponding point for the same motor speed (V2, S1). As described hereinbefore, voltage sensing start relays have been previously used based essentially on this principle as have solid state switching means controlled by an electromechanical alternator.

Figure 2:
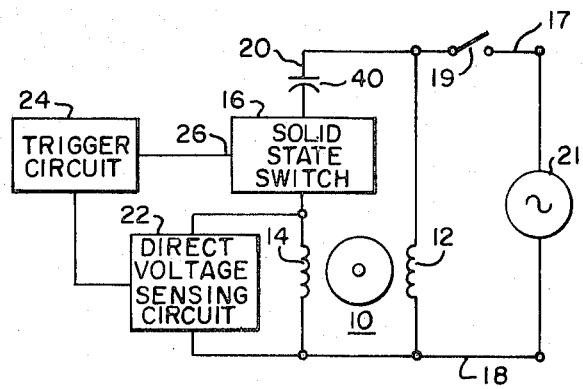
FIG. 2 is a schematic diagram generally representing the arrangement in accordance with the present invention.

FIG. 2 shows a generalized scheme in accordance with this invention for avoiding or minimizing the disadvantages of the prior art. The invention is illustrated as applied to a single phase electric motor 10 having a main or running winding 12 and an auxiliary or starting winding 14 which are disposed on the stator of the motor, ordinarily approximately 90 electrical degrees apart, and which are designed so that their currents are displaced in phase or have means such as a starting capacitor 40 connected in series with the starting winding 14 for phase displacement.

A solid state switch device 16 is provided in series with the starting winding 14. In the embodiment shown the running winding 12 is by itself connected across the line conductors 17 and 18. The starting winding 14 is in a starting winding circuit branch 20 between conductors 17 and 18 that includes the winding 14, the solid state switching device 16 and the starting capacitor (if used) which series connection is in parallel with the running winding 12. Line switch 19 is connected in line 17 to control application of power from AC supply 21. Switch 16 has a characteristic breakdown voltage across its main electrodes that is greater than supply 21 in the absence of any gate signal on control electrode 26.

Connected across the starting winding 14 by direct electrical connection is a circuit portion 22 for sensing the voltage across the starting winding which is a true indication of motor speed. By direct electrical connection is meant the voltage drop across the start winding is sensed by current flow through winding 14 and circuit portion 22 rather than sensing an induced voltage. The circuit portion 22 for direct electrical sensing provides an input to a firing or trigger circuit portion 24 which is connected to the firing or gate electrode 26 of the solid state switch 16. Parameters of the voltage sensing circuit 22 and the firing circuit 24 are preset so as to provide a gate signal to the solid state switch 16 only upon the motor reaching the predetermined speed (e.g, S1 of FIG. 1) at which the starting winding 14 is to be disconnected from the power lines 17 and 18. Upon reaching this "drop out point" the previously on solid state switch 16 is turned off. If the speed decreases to below "the pull in point," which may be of a different value than the drop out point, then the solid state switch 16 is switched on again to apply power to the starting winding.

Figure 3:
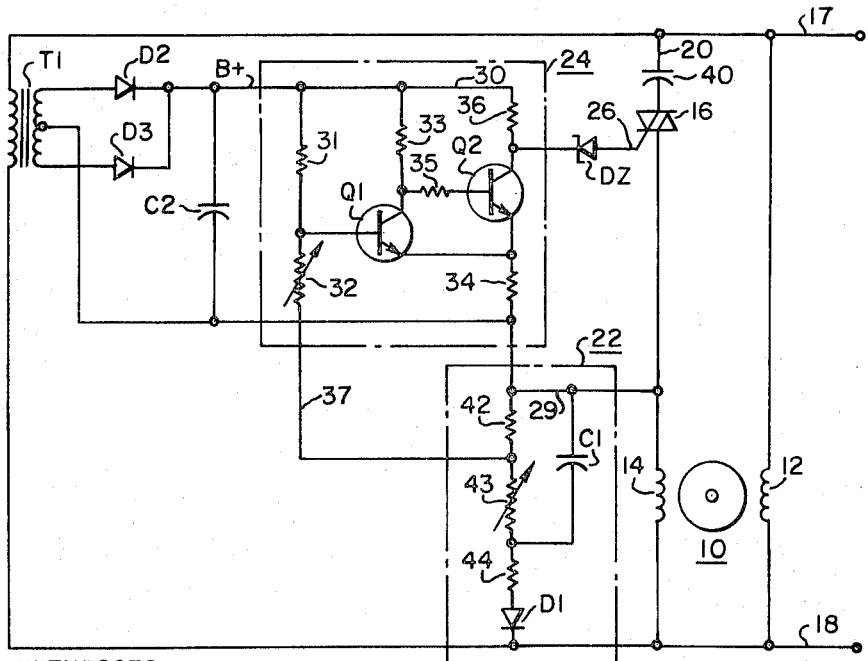
FIG. 3 is a more particular embodiment of the present invention.

FIG. 3 illustrates an embodiment of the present invention that has been successfully made and operated. Like reference numerals indicate elements corresponding to those shown in FIG. 2.

Trigger circuit portion 24 includes transistors Q1 and Q2 that comprise the active elements of a Schmitt trigger circuit. Transistor Q1 has its base connected between resistors 31 and 32. The other end of resistor 31 is connected to a DC voltage supply B+ while the other end of resistor 32 is connected to the direct voltage sensing circuit 22. Other resistors provided in the trigger circuit portion are resistor 33 connected between the collector of Q1 and B+ line 30, resistor 34 connected between the emitter of Q1 and line 29 connected to one side of the start winding 14, resistor 35 connected between the collector Q1 and the base of Q2, and resistor 36 connected between line 30 and the collector of Q2. The emitters of Q1 and Q2 are connected together.

In accordance with known practice, the resistor values are chosen in circuit 24 to cause the output transistor Q2 to switch to a full on or conducting state if the voltage at the base of transistor Q1 is less than some voltage (V2) and Q2 will switch to an off or non-conducting state if the voltage at the base of Q1 is greater than another voltage level V1, that is greater than V2. The magnitudes of V1 and V2 can be very close to each other or may differ by a factor of two to one or greater depending upon the circuit constants.

The DC supply voltage on line 30 is developed in this example by transformer T1 whose primary is connected across line conductors 17 and 18 and whose secondary leads are connected respectively to diode rectifiers D2 and D3 whose cathodes are connected to line 30. Capacitor C2 is connected between line 30 and conductor 29, one of whose ends is connected to a center tap on the secondary of T1.

When Q2 is non-conducting or off, the DC supply voltage on line 30 is connected through resistor 36 and a Zener diode Dz to the control electrode 26 causing device 16 to turn on and conduct continuously, thus energizing the start winding. When transistor Q2 is conducting or on, the voltage at its collector is less than the Zener voltage of the Zener diode and gate current to triac 16 does not flow, thus opening the AC switch circuit and removing line voltage from the starting winding 14.

To have this circuit function as a starting winding switch, circuit portion 22 derives a signal from the starting winding 14 which will give a voltage proportional to motor RPM as indicated in FIG. 1 and cause this voltage to switch the Schmitt trigger circuit as described above. In this embodiment of the invention these functions are provided by the circuit portion 22 that includes a diode D1, an RC filter of resistors 42 and 43 and parallel capacitor C1 connected across the starting winding 14 that produce a DC voltage that is a function of motor speed. In this example an addition resistor 44 is in series with diode D1. A portion of the sensed voltage is taken off between the resistors 42 and 43 by conductor 37 and applied to the Schmitt trigger circuit at the base of Q1 through resistor 32. The voltage on conductor 37 is directly proportional to the start winding voltage and the motor speed. (For convenience the following description assumes voltages V1 and V2 of FIG. 1 appearing on line 37.) When the motor is initially turned on, the feedback voltage on line 37 is less than V1 and Q1 is biased on which in turn causes the triac 16 to conduct. As motor speed increases, the feedback voltage on line 37 builds up to where it exceeds V1 and Q1 switches off, in turn turning the triac 16 off and opening the start winding circuit. When the start winding circuit opens, the feedback voltage drops to V2 and continues to increase until the motor reaches the maximum speed. Since the feedback must drop below V2 for the start switch to be reenergized, it remains off as is desired.

The following are representative values or other identification for elements of the circuit of FIG. 3 that have been successfully used in the practice of this invention:

| | |
|---|---|
| triac 16 | ZJ257B |
| Transistors Q1 & Q2 | 2N1711 |
| Zener diode, DZ | 10V. breakdown |
| Line voltage | 115V. AC |
| DC supply (B+) | 30V. |
| Resistor 31 | 1000 ohms |
| Resistor 32 | 1300 ohms |
| Resistor 33 | 430 ohms |

| | |
|---|---|
| Resistor 34 | 70 ohms |
| Resistor 35 | 1000 ohms |
| Resistor 36 | 300 ohms |
| Resistor 42 | 75 ohms |
| Resistor 43 | 5000 ohms |
| Resistor 44 | 100 ohms |
| Diodes D1, D2, & D3 | 1N649 |
| Capacitor C1 | 25 micro-f. |
| Capacitor C2 | 50 micro-f. |

A motor used in the combination of FIG. 3 was a one-half horsepower capacitor start motor having 1,725 rpm full rated speed. Typical cut-out and cut-in values obtained with the circuit of FIG. 3 with a centrifugal blower loading the motor were 1,535 rpm and 600 rpm, respectively.

This circuit is largely insensitive to line voltage variation since the feedback voltage and the switching voltage levels compensate by shifting in the same direction in response to line voltage variations.

The circuit may be further simplified by integration of the transistors, resistors, diodes and possibly the AC switch in a single unit. It is also possible to avoid the disclosed transformer T1 by incorporating a secondary winding on one of the run winding pole pieces. Other switch means 16 may be employed besides a triac. A silicon controlled rectifier (thyristor) and a diode in parallel combination will function similar to a triac in this application.

The Schmitt trigger circuit is only an example of the control circuit that may be used. Generally, other means such as a blocking oscillator, a bistable circuit or any circuit which will switch on or off at two different levels of input voltage can be used.

I claim:

1. In combination: a single phase electric motor having a main winding and a starting winding; a three terminal solid state switch means having a pair of terminals in series circuit connection with said starting winding; a voltage sensing circuit directly connected across said starting winding to develop a first voltage signal proportional to motor speed; a trigger circuit connected to receive said first voltage signal and to apply or remove a switching signal to a third terminal of said solid state switch means only when said first voltage signal is of predetermined magnitude.

2. The combination of claim 1 wherein: said solid state switch means has a characteristic breakdown voltage, in the absence of signal on said gate electrode, that is greater than line voltage used to operate said motor; and further comprising a starting capacitor in series circuit connection with said switch means and said starting winding.

3. The subject matter of claim 2 wherein: said solid state switch means is a triac.

4. The subject matter of claim 1 wherein: said means for directly electrically sensing voltage across said starting winding has an output proportional to the speed of the motor regardless of load conditions on said motor.

5. The subject matter of claim 4 wherein: said output of said voltage sensing circuit is supplied to said trigger circuit and changes the state of the output of said trigger circuit between two potential values that are in inverse relation to voltages from said voltage sensing circuit to which said trigger circuit responds.

* * * * *